United States Patent
Sahoo et al.

(10) Patent No.: US 10,069,430 B2
(45) Date of Patent: Sep. 4, 2018

(54) MODULAR CONVERTER WITH MULTILEVEL SUBMODULES

(71) Applicants: Ashish Sahoo, Minneapolis, MN (US); Ned Mohan, St. Paul, MN (US)

(72) Inventors: Ashish Sahoo, Minneapolis, MN (US); Ned Mohan, St. Paul, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 14/536,321

(22) Filed: Nov. 7, 2014

(65) Prior Publication Data

US 2015/0124506 A1    May 7, 2015

Related U.S. Application Data

(60) Provisional application No. 61/901,381, filed on Nov. 7, 2013.

(51) Int. Cl.
*H02M 1/32* (2007.01)
*H02M 1/00* (2006.01)
(Continued)

(52) U.S. Cl.
CPC ........... *H02M 5/225* (2013.01); *H02M 7/483* (2013.01); *H02M 7/4807* (2013.01); *H02P 27/08* (2013.01);
(Continued)

(58) Field of Classification Search
CPC .. H02M 1/32; H02M 2007/4835; H02M 1/08; H02M 7/487; H02M 2001/0003
(Continued)

(56) References Cited

U.S. PATENT DOCUMENTS

| 6,995,994 B2 * | 2/2006 | Bijlenga | H02M 7/4826 363/51 |
| 8,018,083 B2 | 9/2011 | Larsen et al. | |

(Continued)

FOREIGN PATENT DOCUMENTS

| CN | 102377193 A | 3/2012 |
| KR | 20110034898 A | 4/2011 |

(Continued)

OTHER PUBLICATIONS

IEEE Xplore—Saeedifard, Maryam et al., A Space Vector Modulation Strategy for a Back-to-Back Five-Level HVDC Converter System, Feb. 2009.

(Continued)

*Primary Examiner* — Timothy J Dole
*Assistant Examiner* — Sisay G Tiku
(74) *Attorney, Agent, or Firm* — Steven M. Koehler; Westman, Champlin & Koehler, P.A.

(57) ABSTRACT

One aspect of the disclosure includes a submodule topology for a modular multilevel converter. The submodule topology includes two electronic switches connected together with a first series connection terminal connecting the electronic switches in series, the series connected switches being connected in parallel with two capacitors connected together with a second series connection terminal connecting the capacitors in series. A bidirectional electronic switch connects the first series connection terminal with the second series connected terminal. An output voltage is obtained across the first series connected terminal and a common terminal formed by the parallel connection of the series connected switches with the series connected capacitors.

23 Claims, 14 Drawing Sheets

(51) Int. Cl.
| | |
|---|---|
| H02M 1/08 | (2006.01) |
| H02M 7/483 | (2007.01) |
| H02M 5/22 | (2006.01) |
| H02M 7/48 | (2007.01) |
| H02P 27/08 | (2006.01) |
| H02P 27/14 | (2006.01) |
| H02M 7/487 | (2007.01) |

(52) U.S. Cl.
CPC ............. *H02P 27/14* (2013.01); *H02M 7/487* (2013.01); *H02M 2007/4835* (2013.01)

(58) Field of Classification Search
USPC ............ 363/34, 44, 48, 65, 67, 71, 123–127
See application file for complete search history.

(56) References Cited

U.S. PATENT DOCUMENTS

| | | | | |
|---|---|---|---|---|
| 8,547,718 | B2* | 10/2013 | Katoh | H02M 1/088 363/131 |
| 9,106,074 | B2* | 8/2015 | Takizawa | H02H 7/1203 |
| 9,334,749 | B2* | 5/2016 | Das | F01D 15/10 |
| 2004/0095790 | A1* | 5/2004 | Bakran | H02M 7/487 363/132 |
| 2004/0240240 | A1* | 12/2004 | Bijlenga | H02M 7/4826 363/56.12 |
| 2008/0001408 | A1* | 1/2008 | Liu | F03D 7/00 290/44 |
| 2011/0019449 | A1* | 1/2011 | Katoh | H02M 1/088 363/124 |
| 2011/0049994 | A1* | 3/2011 | Hiller | H02M 7/49 307/82 |
| 2011/0170322 | A1* | 7/2011 | Sato | H02J 9/062 363/40 |
| 2013/0044526 | A1* | 2/2013 | Soua | H02M 7/487 363/131 |
| 2013/0128629 | A1 | 5/2013 | Clare et al. | |
| 2013/0184884 | A1* | 7/2013 | More | F03D 7/0284 700/291 |
| 2013/0314957 | A1* | 11/2013 | Gupta | H02M 7/483 363/71 |
| 2014/0152109 | A1* | 6/2014 | Kanakasabai | H02M 3/33584 307/66 |
| 2014/0197639 | A1* | 7/2014 | Bala | H02J 3/386 290/54 |
| 2015/0214828 | A1* | 7/2015 | Zhang | H02M 1/08 363/123 |
| 2016/0218637 | A1* | 7/2016 | Fan | H02M 7/483 |
| 2016/0268915 | A1* | 9/2016 | Lin | H02M 1/32 |

FOREIGN PATENT DOCUMENTS

| | | |
|---|---|---|
| WO | 2010102667 A1 | 9/2010 |
| WO | 2011134865 A3 | 11/2011 |
| WO | 2011160678 A1 | 12/2011 |
| WO | 2012024984 A1 | 3/2012 |
| WO | 2012055435 A1 | 5/2012 |
| WO | 2012113704 A2 | 8/2012 |
| WO | 2013044940 A1 | 4/2013 |
| WO | 2013071975 A1 | 5/2013 |

OTHER PUBLICATIONS

IEEE Xplore—Glinka, M., Prototype of Multiphase Modular-Multilevel-Converter with 2 MW power rating and 17-level-output-voltage, Apr. 2004.
IEEE Xplore—Ng, Chong H. et al., A Multilevel Modular Converter for a Large, Light Weight Wind Turbine Generator, May 2008.
IEEE Xplore—Lesnicar, A. et al., An innovative modular multilevel converter topology suitable for a wide power range, Jun. 26, 2003.
IEEE Xplore—Flourentzou, Nikolas et al., VSC-Based HVDC Power Transmission Systems: An Overview, Mar. 2009.
IEEE Xplore—Li, Ke et al., New Technologies of Modular Multilevel Converter for VSC-HVDC Application, Mar. 31, 2010.
IEEE Xplore—Rohner, Steffen et al., Modulation, Losses, and Semiconductor Requirements of Modular Multilevel Converters, Aug. 2010.
IEEE Xplore—Davidson, C.C. et al., Innovative concepts for hybrid multi-level converters for HVDC power transmission, Oct. 21, 2010.
Ludois, Daniel, An Examination of AC/HVDC Circuits for Interconnecting Bulk Wind Generation with the Electric Grid, Jun. 18, 2010.
IEEE Xplore—Percis, E. Sheeba et al., The impact of BoBC in off-shore wind energy conversion system, Mar. 19, 2011.
Springer Link, Encarnacao, Luis et al., Grid Integration of Offshore Wind Farms Using Modular Marx Multilevel Converters—Springer, Feb. 29, 2012.
IEEE Xplore—Glasdam, Jakob et al., Review on multi-level voltage source converter based HVDC technologies for grid connection of large offshore farms, Nov. 2, 2012.
IEEE Xplore—Wang, Xinyu et al., Comparisons of Different Three-Stage Three-Phase Cascaded Modular Topologies for Power Electronic Transformer, 2012.
Holtsmark, Nathalie et al., An All-DC Offshore Wind Farm with Series-Connected Turbines: An Alternative to the Classical Parallel AC Model?, IEEE Transactions on Industrial Electronics, vol. 60, No. 6, Jun. 2013.
Haibin, Zhu et al., Design of Power Electronic Transformer Based on Modular Multilevel Converter, Power and Energy Engineering Conference (APPEEC), 2012.
Carpita, Mauro et al., Multilevel Converter for Traction Applications: Small-Scale Prototype Tests Results, IEEE Transactions on Industrial Electronics, vol. 55, No. 5, May 2008.
Shi, Jianjiang et al., Research on Voltage and Power Balance Control for Cascaded Modular Solid-State Transformer, IEEE Transactions on Power Electronics, vol. 26, No. 4, Apr. 2011.
Rashed, Mohamed et al., High Performance Multilevel Converter Topology for Interfacing Energy Storage Systems with Medium Voltage Grids, IECON 2010—36th Annual Conference on IEEE Industrial Electronics Society, Nov. 10, 2010.
She, Xu et al., Review of Solid-State Transformer Technologies and Their Application in Power Distribution Systems, IEEE Journal of Emerging and Selected Topics in Power Electronics, vol. 1, No. 3, Sep. 2013.
Glinka, Martin et al., A New AC/AC Multilevel Converter Family, IEEE Transactions on Industrial Electronics, vol. 52, No. 3, Jun. 2005.
Lai, Jih-Sheng et al., Multilevel Intelligent Universal Transformer for Medium Voltage Applications, Industry Applications Conference, 2005. Fourtieth IAS Annual Meeting. Conference Record of the 2005, vol. 3.
Krishnamoorthy, Harish S. et al., Wind Turbine Generator-Battery Energy Storage Utility Interface Converter Topology with Medium Frequency Transformer Link, IEEE Transactions on Power Electronics, vol. 29, No. 8, Aug. 2014.
Deng, Fujin et al., A Control Method for Voltage Balancing in Modular Multilevel Converters, IEEE Transactions on Power Electronics, vol. 29, No. 1, Jan. 2014.
Fan, Shengfang et al., An Improved Control System for Modular Multilevel Converters with new Modulation Strategy and Voltage Balancing Control, IEEE Transactions on Power Electronics, vol. 30, No. 1, Jan. 2015.
Zhang, Y. et al., Analysis of Modular Multilevel Converter Capacitor Voltage Balancing Based on Phase Voltage Redundant States, IET Power Electronics, Dec. 24, 2011.
Iman-Eini, H. et al., Design of Power Electronic Transformer based on Cascaded H-bridge Multilevel Converter, IEEE 2007.
Qin, Jiangchao et al., Reduced Switching-Frequency Voltage-Balacning Strategies for Modular Multilevel HVDC Converters, IEEE Transactions on Power Delivery, vol. 28, No. 4, Oct. 2013.

(56) References Cited

OTHER PUBLICATIONS

Wang, Kui et al., Voltage Balancing and Fluctuation-Suppression Methods of Floating Capacitors in a New Modular Multilevel Converter, IEEE Transactions on Industrial Electronics, vol. 60, No. 5, May 2013.

* cited by examiner

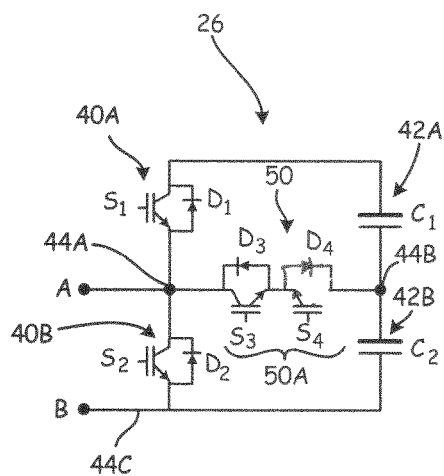
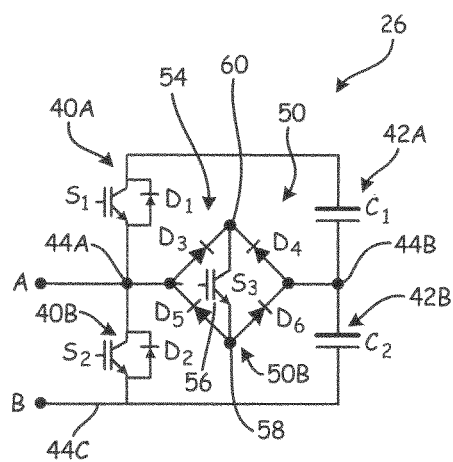
Fig. 2A        Fig. 2B
| $S_1$ | $S_2$ | $S_3, S_4$ | $V_{AB}$ |
|---|---|---|---|
| 1 | 0 | 0 | $V_{C_1} + V_{C_2}$ |
| 0 | 0 | 1 | $V_{C_2}$ |
| 0 | 1 | 0 | 0 |
| $S_1$ | $S_2$ | $S_3$ | $V_{AB}$ |
|---|---|---|---|
| 1 | 0 | 0 | $V_{C_1} + V_{C_2}$ |
| 0 | 0 | 1 | $V_{C_2}$ |
| 0 | 1 | 0 | 0 |
Fig. 3A        Fig. 3B

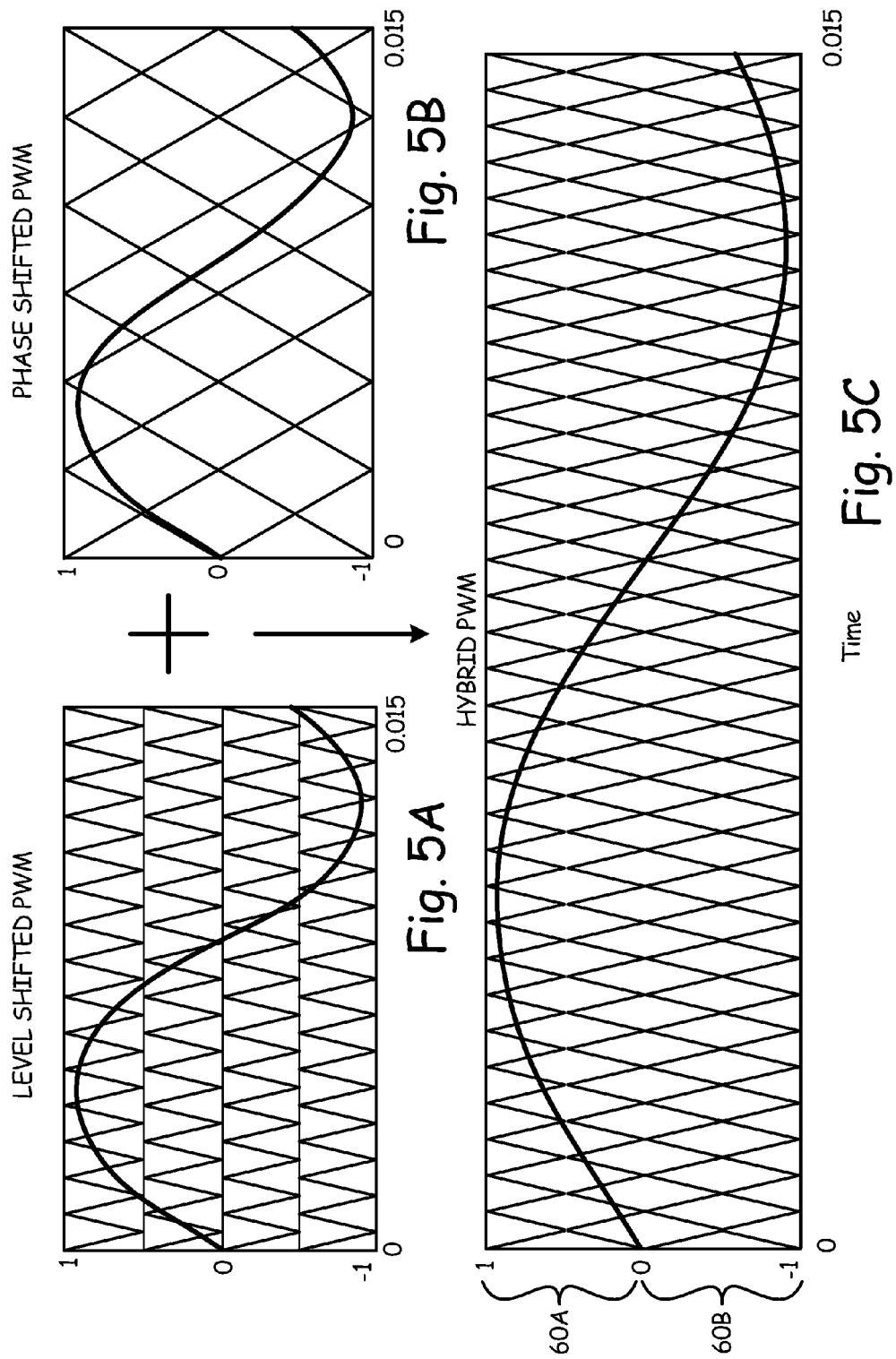

MODULAR CONVERTER WITH MULTILEVEL SUBMODULES

CROSS-REFERENCE TO RELATED APPLICATION

This application claims the benefit of provisional patent application Ser. No. 61/901381, filed Nov. 7, 2013, the content of which is incorporated herein in its entirety.

STATEMENT REGARDING FEDERALLY SPONSORED RESEARCH OR DEVELOPMENT

This invention was made with government support under N00014-13-1-0511 awarded by the Dept. of the Navy. The government has certain rights in the invention.

BACKGROUND

The discussion below is merely provided for general background information and is not intended to be used as an aid in determining the scope of the claimed subject matter.

Forced commutated converters have now become an attractive choice in high voltage, high power transmission and distribution applications due to the rapid development in power semiconductor technologies and other additional advantages like full real-reactive power control, dynamic voltage regulation, black start capability, etc. This technology initially started with the voltage source converters (VSC) has now led to many new multilevel topologies with advanced features. A well-known topology is the Modular multilevel converter (MMC). Due to the modular structure, the topology is compact and scalable to reach any number of voltage levels by simple series connection of submodules resulting in higher reliability and easy maintenance.

Over the years, researchers have studied different MMC topologies in attempts to improve its features. However, most of the converter topologies still focused on the conventional half bridge (HB) submodule or the full bridge (FB) submodules. A clamp double (CD) submodule has been proposed and is basically a series connection of two half bridge submodules with better fault handling capability. But it uses an additional switch and two diodes in normal operation which increases the semiconductor losses.

Multilevel converters that are scalable, have less complexity and/or have lower semiconductor losses are always desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One aspect of the disclosure includes a submodule topology for a modular multilevel converter. The submodule topology includes two electronic switches (e.g. unidirectional switches such as but not limited to IGBTs each having an anti-parallel diode) connected together with a first series connection terminal connecting the electronic switches in series, the series connected switches being connected in parallel with two capacitors connected together with a second series connection terminal connecting the capacitors in series. A bidirectional electronic switch connects the first series connection terminal with the second series connected terminal. An output voltage is obtained across the first series connected terminal and a common terminal formed by the parallel connection of the series connected switches with the series connected capacitors. In a first exemplary embodiment, the bidirectional switch can comprise a 4-quadrant bidirectional switch in a common emitter configuration. In a second exemplary embodiment, the bidirectional switch can comprise a full bridge rectifier having conventionally connected diodes and an electronic switch connected between the commonly connected anodes and the commonly connected cathodes.

Some of the advantages of the topology described above include that half the number of submodules are required as compared to a standard half bridge submodules to attain the same number of levels. The additional bidirectional switch will have half the voltage stress in a blocking state. The semiconductor losses are considerably reduced. Gate drive circuitry complexity is reduced and favors fault handling capability.

BRIEF DESCRIPTION OF THE DRAWINGS

FIGS. 2A and 2B are schematic diagrams of topologies of submodules.

FIGS. 3A and 3B are tables providing switching states for the submodules 2A and 2B, respectively.

FIGS. 5A-5C are pictorial illustrations of carrier based pulse width modulation (PWM) techniques.

FIGS. 8-14A are schematic diagrams of applications of modular, multilevel, multi-phase converter(s).

DETAILED DESCRIPTION OF THE ILLUSTRATIVE EMBODIMENTS

Figure 1A:
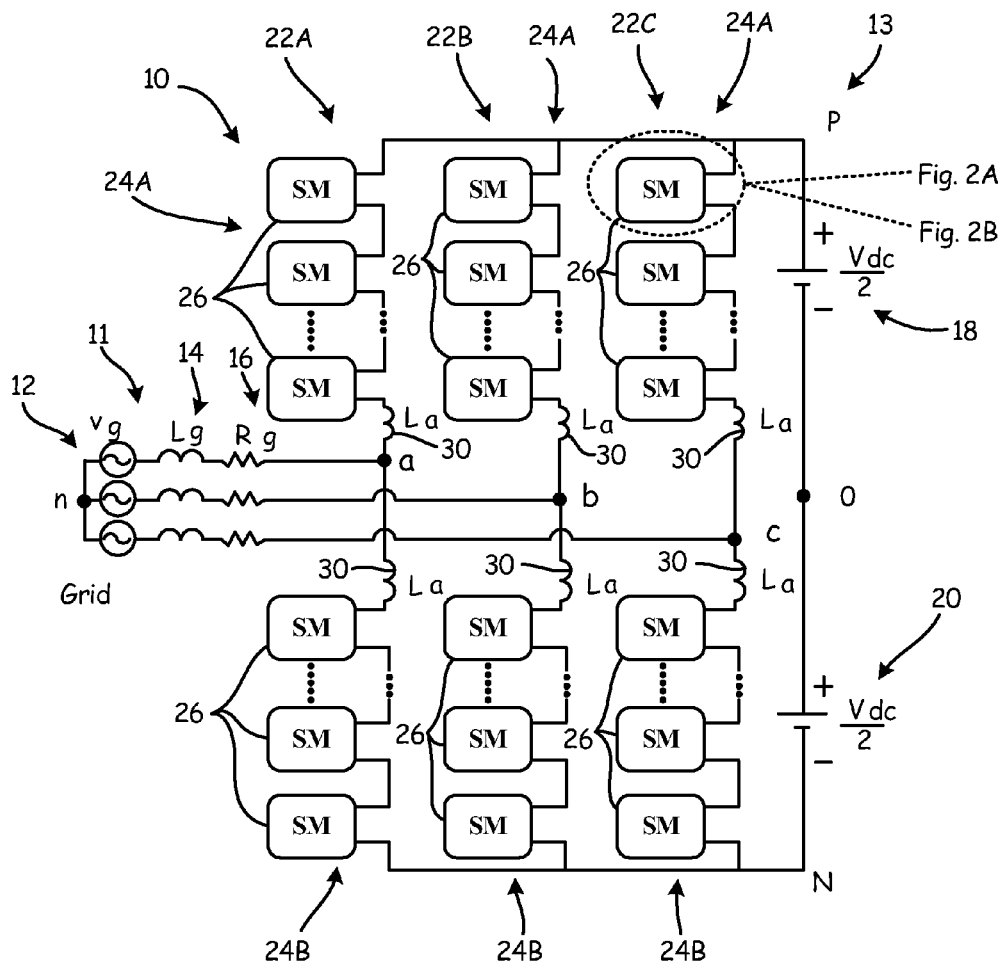
FIG. 1A is a schematic diagram of a modular, multilevel, multi-phase converter.

FIG. 1A illustrates an exemplary embodiment of a modular multilevel converter 10 using submodules herein described. In the embodiment illustrated the modular multilevel converter (MMC) 10 converts between AC and DC such as needed in a HVDC converter station used in a power grid. However, the application herein illustrated should not be considered limiting in that the MMC 10 can also be used, for example, in electric motor drives, and is particularly useful in applications where the drive application are at medium voltage levels (1.1 kV to 25 KV) or high voltage direct current (HVDC), where voltage levels are in the hundreds of kilovolts.

Figure 1B:
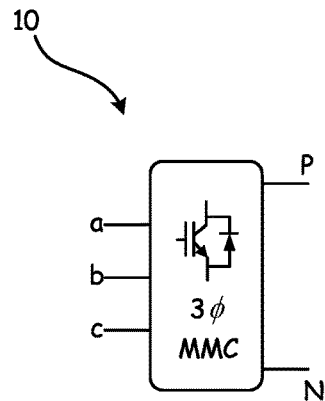
FIG. 1B is a schematic representation of the modular, multilevel, multi-phase converter.

In FIG. 1, an AC end or side 11 of the grid is represented by an ideal voltage source $v_g$ 12, which is interfaced with the MMC 10 by converter reactance Lg 14 for power transfer and resistance Rg 16 to account for non-idealities. The converter reactance Lg 14 is the combination of all line reactances, transformer leakage inductances and converter boost inductance required for power transfer between the grid and the converter 10. A high voltage DC side 13 is modeled by two ideal DC voltage sources 18, 20 (VP0=V0N=Vdc/2). In the three phase system exemplified in FIG. 1, each converter leg 22A, 22B and 22C is made up of two arms 24A, 24B, each having n series connected submodules (SM) 26. Each arm 24A, 24B also includes a protection choke La 30 to limit over-currents during any internal or external faults.

Two exemplary embodiments of the topology of the submodule 26 are illustrated in FIGS. 2A and 2B. Generally, each includes two electronic switches 40A, 40B (e.g. unidirectional switches such as but not limited to IGBTs each having an anti-parallel diode 42) connected together with a first series connection terminal 44A connecting the electronic switches 40A, 40B in series, the series connected switches 40A, 40B being connected in parallel with two capacitors 46A, 46B connected together with a second series connection terminal 44B connecting the capacitors 46A, 46B in series. A bidirectional electronic switch 50 connects the first series connection terminal 44A with the second series connected terminal 44B. An output voltage 52 is obtained across the first series connected terminal 44A and a common terminal 44C formed by the parallel connection of the series connected switches 40A, 40B with the series connected capacitors 42A, 42B. In a first exemplary embodiment, the bidirectional switch 50 can comprise a 4-quadrant bidirectional switch 50A in common emitter configuration. In a second exemplary embodiment, the bidirectional switch 50 can comprise a circuit 50B having a full bridge rectifier circuit 54 having conventionally connected diodes and an electronic switch 56 connected between the commonly connected anodes 58 and the commonly connected cathodes 60 of the rectifier circuit 54.

Unlike the conventional half bridge submodules which can achieve only two voltage levels, the submodule topology 26 can switch to three voltage levels depending on the switching states as shown in FIG. 3A and FIG. 3B for the topologies of FIG. 2A and FIG. 2B, respectively. This is achieved by the bidirectional switch 50 (which, for example, can take two exemplary configurations 50A, 50B as described above and illustrated in FIGS. 2A and 2B). It should be noted, the bidirectional switch 50 in the new topology has to block a lower voltage VC2 and hence can be of lower rating. The capacitance of the submodule 26 is divided into two capacitors 42A (C1) and 42B (C2) whose voltages are controlled to be equal.

As described above, the topology of FIG. 2A can be made up of two unidirectional IGBTs 40A, 40B with anti-parallel diodes, one 4-quadrant bidirectional switch 50A in common emitter configuration, and two capacitors 42A, 42B. If the submodule is controlled such that capacitor voltages are properly balanced to be equal (VC1=VC2=VC/2), the submodule 26 can reach 3 voltage levels, VC, VC/2 and 0. The states are called FULL-ON, HALF-ON and BYPASS state as identified in FIG. 4. Referring to the table of FIG. 3A, FULL-ON state is provided when switch S1 is on with switches S2, S3 and S4 off. Depending on the current direction, the FULL-ON state IGBT S1 or anti-parallel diode D1 conducts and voltage across the submodule 26 is equal to VC in the FULL-ON state (See also FIG. 4). The bidirectional switch 50 of the two topologies is represented by an ideal switch S in FIG. 4. Referring back to FIG. 3A and FIG. 4, the HALF-ON state exists when the bidirectional switch 50A conducts and half the voltage VC/2 is provided across terminals 44A and 44C. Again, referring to FIG. 3A and FIG. 4, when switch 40B is on, the submodule is bypassed and the submodule 26 is in the BYPASS state.

Figure 4:
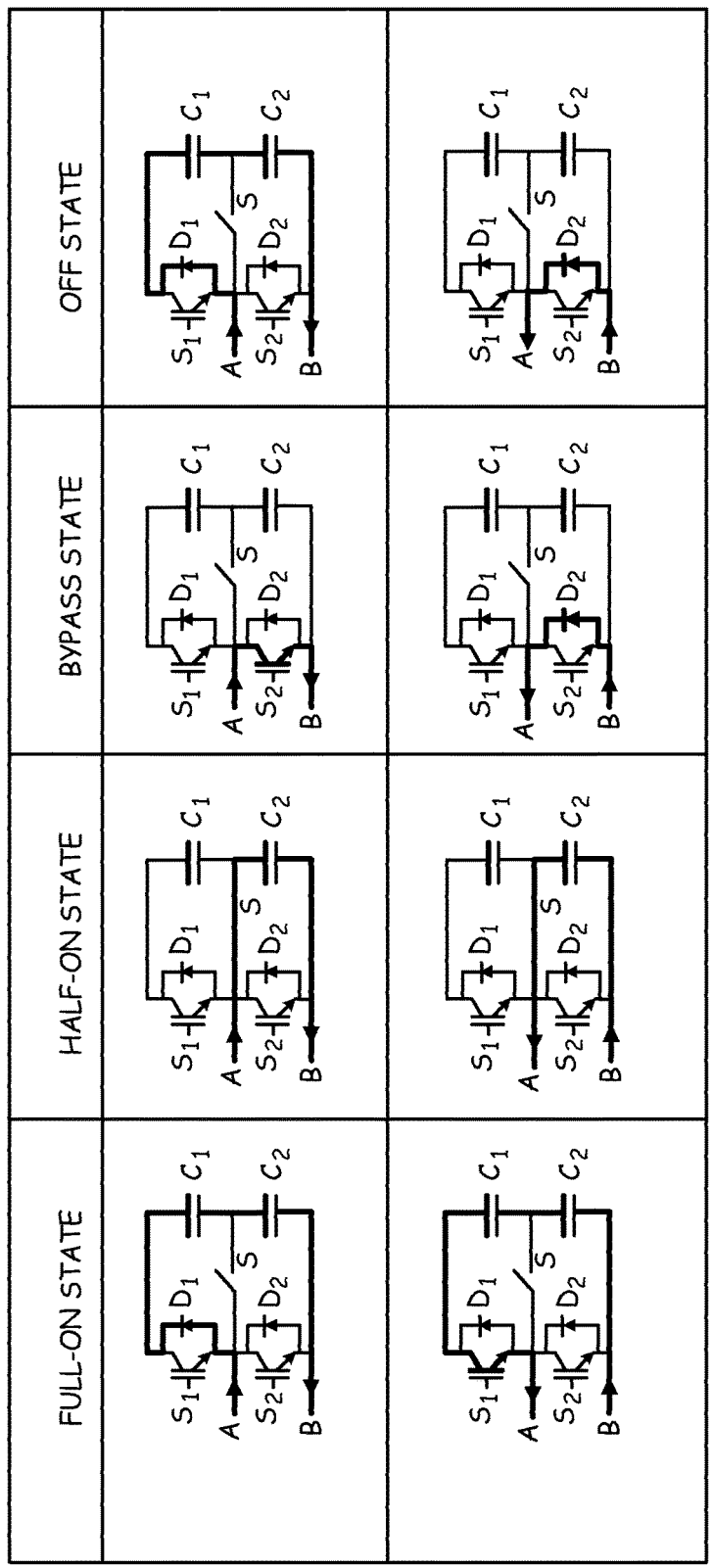
FIG. 4 is a pictorial illustration for the switching states of some of the switching states of the submodules 2A and 2B.

The topology of FIG. 2B works in a similar manner. Referring to FIG. 3B and FIG. 4, the FULL-ON state is obtained with only switch 40A on. In the HALF-ON state, the conduction takes place through two anti-parallel diodes of the rectifier 54 and the switch 506. So the losses are more as compared to the topology of FIG. 2A but it eliminates the need of an additional IGBT. SiC diodes have already started commercializing and hence the losses across these two diodes can be highly minimized. The BY-PASS state is the same where only switch 40B is on.

There is also a state called OFF when all switches in either topology are off as illustrated in FIG. 4. This state does not occur in normal operation of the converter 10 and can exist only before pre-energization. The capacitors 42A, 42B in the submodules are all precharged to VC/2 before regular operation using some precharge technique. All the above states are shown in FIG. 4 where the current path with direction is highlighted with dark lines.

The most common way of generating the gate signals for the IGBTs is the carrier based pulse width modulation (PWM) technique. Different carriers like phase shifted (PS), level shifted or phase disposition (PD), phase opposition disposition (POD), and alternative phase opposition disposition (APOD) are known for 2-level half bridge submodules. In a level shifted PWM scheme, the carrier waveforms are stacked one on top of the other as seen in FIG. 5a, whereas in phase shifted PWM scheme, all the carriers are on the same level but shifted such that they are equally spaced in one cycle, FIG. 5b.

An aspect of the present disclosure includes a hybrid PWM scheme which combines the two schemes mentioned above as shown in FIG. 5c. The hybrid scheme is composed of two sets or groups of carrier waveforms 60A and 60B that are level shifted between groups 60A and 60B and phase shifted within its own group. Just like the phase shifted modulation, every other waveform from each group 60A, 60B is assigned to the upper arm 24A and the remaining to the lower arm 24B. The carriers are phase shifted for the submodules 26 and level shifted for the electronic switches 40A, 40B (e.g. IGBTs) inside each submodule 26. The three switches 40A, 40B and 50 inside each submodule 26 must have complementary gate signals and hence level shifted carriers be used. By using this scheme it is possible to have two sets of capacitors where one set is used more often than the other, but within each set the capacitors are used equally. In the proposed topology the upper capacitor 42A (C1) from each submodule 26 can only be applied when the lower capacitor 42B (C2) has already been applied. Each of the upper submodule capacitors 42A will be on the level that is used less, and the lower capacitors 42B will be on the level that is used most. The capacitors Are unequally divided with C1=C/3 and C2=2C/3. Since each set is used equally and the lower capacitors 42B are larger, the voltage of all capacitors will get somewhat balanced.

Other events can cause the capacitor's voltage to get unbalanced, so an additional balancing technique is described below.

Figure 6A:
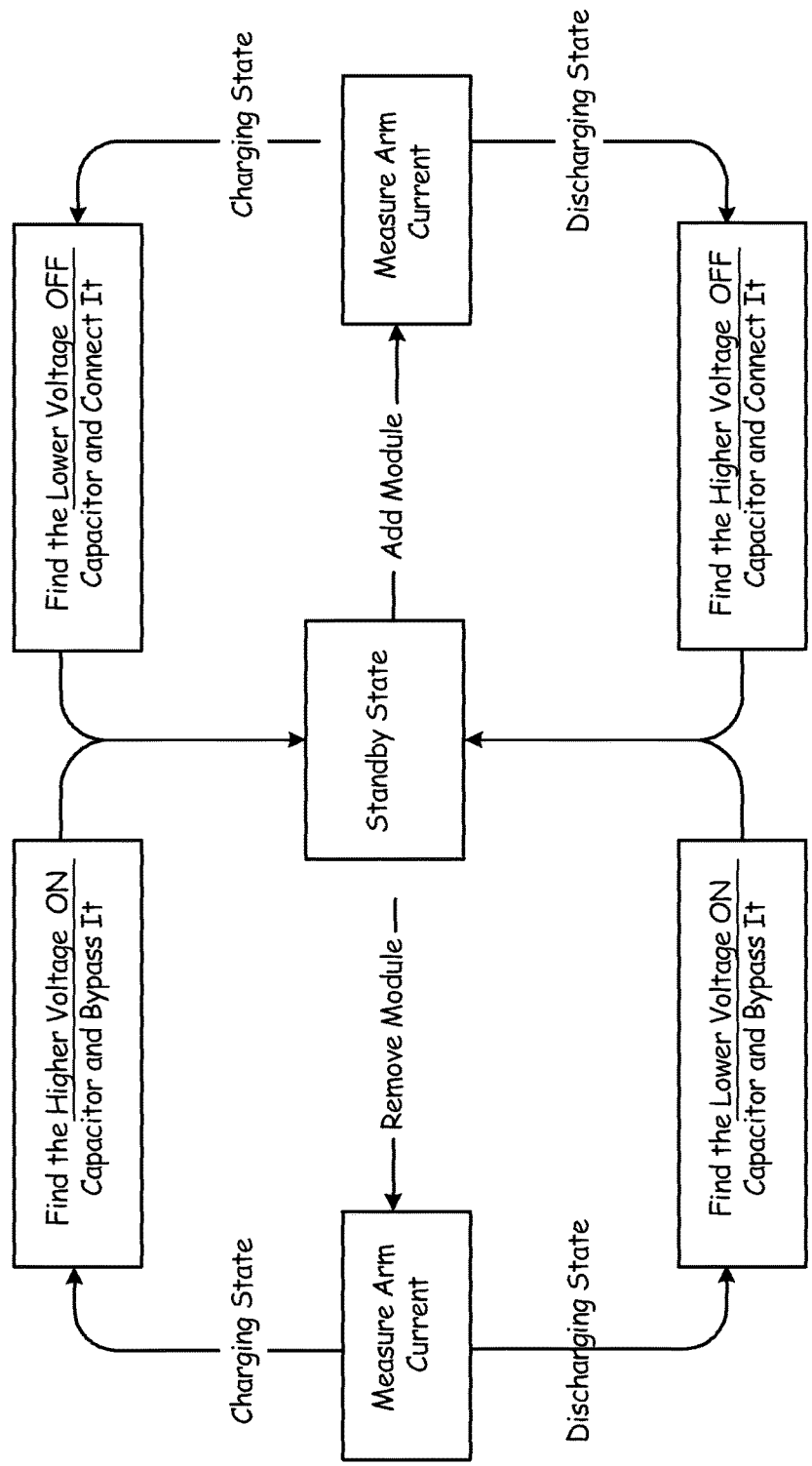
FIGS. 6A and 6B are state diagrams illustrating adding and removing submodules for voltage balancing.

Under ideal operation, balancing of the capacitor is not necessary. The reason is the unequal capacitor values selected and used equally to maintain the voltages balanced. However, in real situations capacitors will degrade and other errors might occur. Hence a voltage balancing technique may be desired. As indicated above, unequal capacitor values of C1=C/3 and C2=2C/3 are used to balance the charge. Using this design, the basic idea of the voltage balancing algorithm is to use the capacitors with the highest voltage when the MMC 10 is on a discharging state, and use the capacitors with the lowest voltage when it is on a charging state. A state flow representation of the algorithm is generally shown in FIG. 6A, and with more particularity in FIG. 6B. To determine when a capacitor is added or removed, the interceptions between the triangular waveforms and the reference voltage FIG. 7 are noted. If the reference voltage becomes less than a carrier then remove a capacitor. In FIG. 7, point P1 indicates where an upper capacitor 42A needs to be removed by transitioning from the FULL-ON state to the HALF-ON state (FIG. 4), and point P3 indicates where the lower capacitor 42B is removed by transitioning from the HALF-ON state to the BYPASS state.

If the reference becomes greater, then a capacitor needs to be added. Point P2 indicates where an upper capacitor 42A is added by transitioning from the HALF-ON state to the FULL-ON state, while point P4 indicates where a lower capacitor 42B is added by transitioning from the BYPASS state to the HALF-ON state.

Figure 6B:
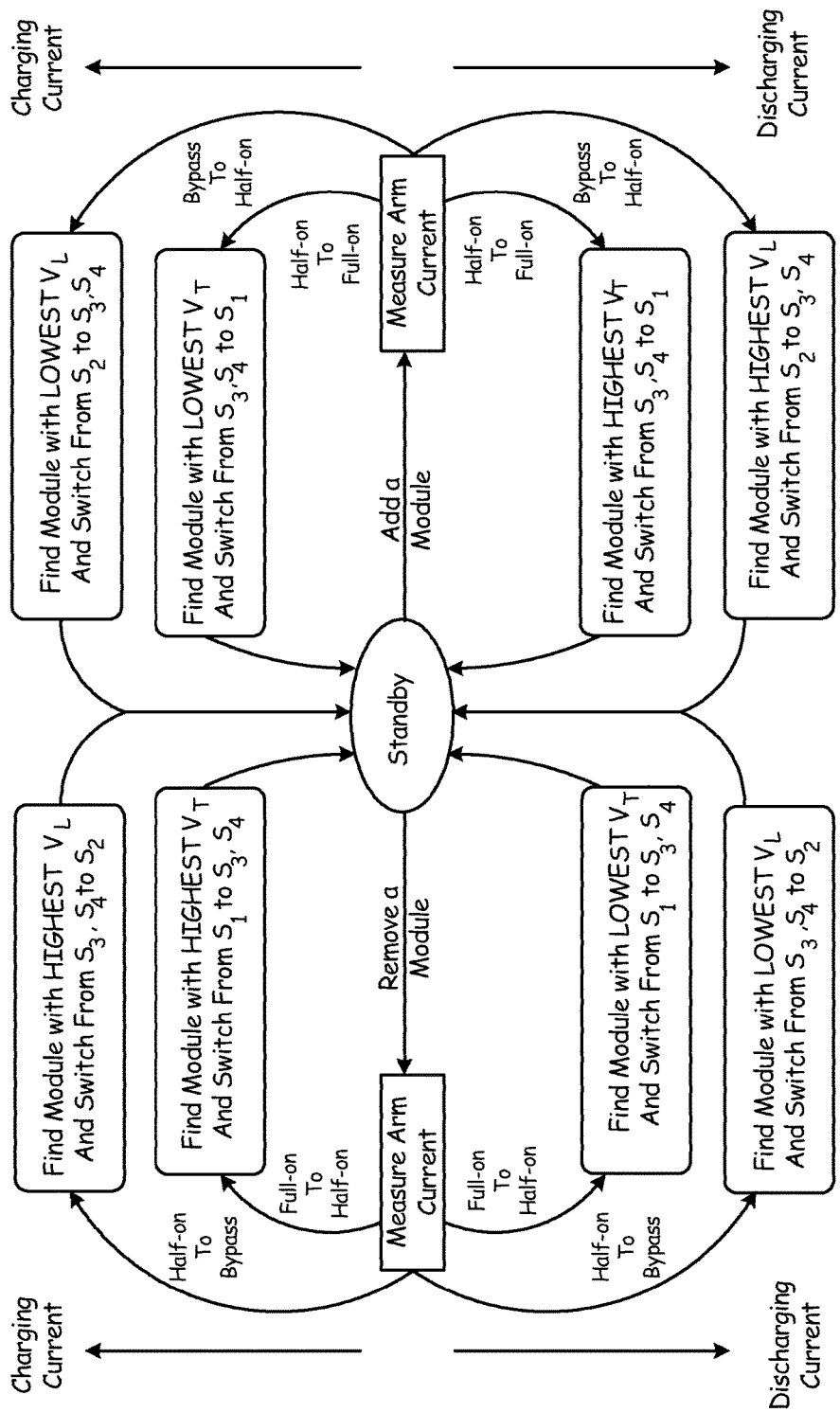
Figure 7:
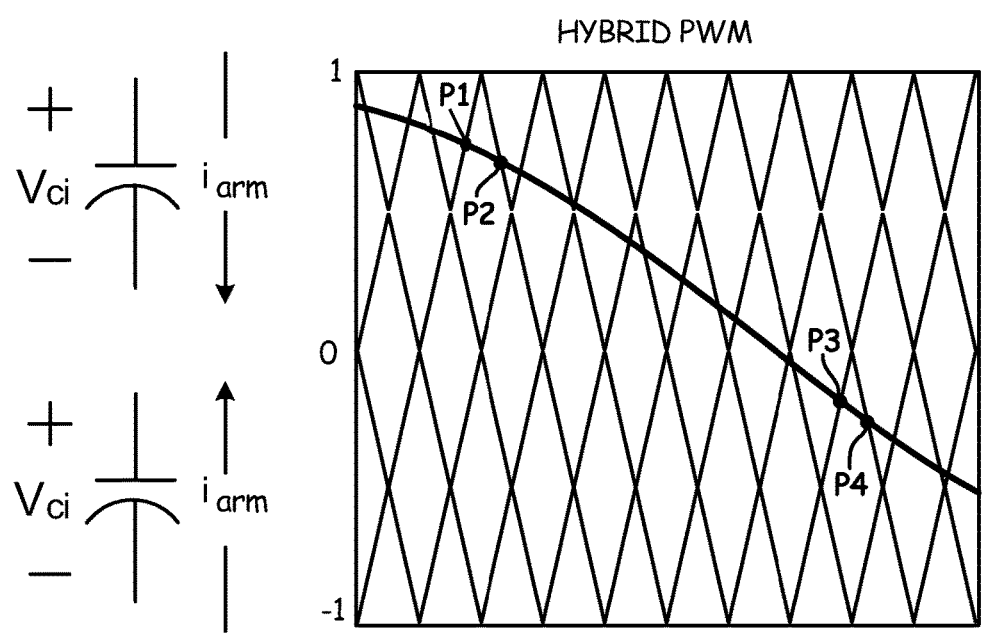
FIG. 7 is a pictorial illustration of adding and removing submodules in accordance with the state diagrams of FIGS. 6A and 6B.

Referring to FIGS. 6A and 6B, the arm current is measured to know if the MMC 10 is on a charging state or discharging state. If the current is going into the capacitor then the MMC 10 is in a charging state, whereas if the current is coming out of the capacitor the MMC 10 is on a discharging state. FIG. 6A generally shows when modules are added or removed. However, this algorithm can be applied independently for the upper capacitors 42A and the lower capacitors 42B in both the arms, which is illustrated.

As stated above, the idea is to use the capacitors with the highest voltage when the MMC is on a discharging state, and use the capacitors with the lowest voltage when it is on a charging state. Since in FULL-ON state, both upper and lower capacitor are charged/discharged, the total submodule voltage VT*=VC1+C2 is monitored. For the transitions between HALF-ON and BYPASS state, only VL*=VC2 is required. To determine when a capacitor is added or removed, the interceptions between the triangular waveforms and the reference voltage are noted. If the reference voltage becomes lesser than a carrier then remove a capacitor and vice versa. The arm current is measured to know if the MMC is on a charging state or discharging state. The entire balancing algorithm is shown by a state machine in FIG. 6B.

For the transitions between HALF-ON and FULL-ON/BYPASS state, there is a change of switching from a bidirectional switch. A reduced 4-step can be implemented resulting in ZCS in ⅔rd of the transitions. This results in only 3 transitions. The direction of arm current is a feedback for this commutation. Using the submodule embodiment of FIG. 2A by way of example, this includes:
1) Turn the passive outgoing IGBT OFF if present;
2) Turn the active incoming IGBT ON if present;
3) Turn the active outgoing IGBT OFF if present; and
4) Turn the passive incoming IGBT ON if present.

The active IGBTs imply the IGBTs that are conducting before and after the commutation and the passive IGBTs imply those that don't conduct. In case of commutation between FULL-ON and BYPASS state, the strategy reduces to dead time compensation. An example of the reduced 3-step commutation can be illustrated with the topology of FIG. 2A and the table below.

|    | $S_1$ | $S_2$ | $S_3$ | $S_4$ | $D_1$ | $D_2$ | $D_3$ | $D_4$ |
|----|-------|-------|-------|-------|-------|-------|-------|-------|
|    | 1     | 0     | 0     | 0     | 0     | 0     | 0     | 0     |
| A1 | 1     | 0     | 0     | 1     | 0     | 0     | 0     | 0     |
| A2 | 0     | 0     | 0     | 1     | 0     | 0     | 1     | 0     |
| P1 | 0     | 0     | 1     | 1     | 0     | 0     | 1     | 0     |

From a transition from FULL-ON to HALF-ON state, it involves two active transitions (A1, A2) and one passive transition (P1). With the proposed commutation technique, ⅔rd of the transitions would be soft switched at zero current.

Figure 1C:
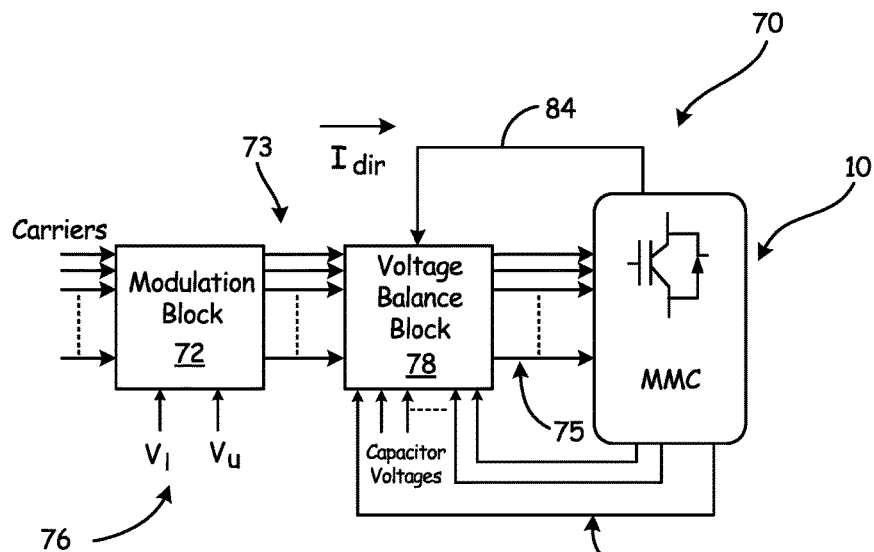
FIG. 1C is a schematic diagram of a controller.

A controller 70 for controlling the switches of the submodules 26 as described above based on command, voltage and/or current feedback is illustrated generally in FIG. 1C. It should be understood that the depiction, arrangement and/or description of all of the various modules, components and the like herein are done so for the purposes of understanding the purpose or role of such elements and should not be considered limiting, but rather that such modules, components and the like can be combined together or separated as desired. In addition, analog and/or digital circuitry or hardware can be used to implement the modules, components and the like where, if necessary, analog-to-digital and digital-to-analog converters are used. Many of the modules, components and the like can also be implemented using software executed on processing circuitry having a suitable processor with memory to store the executable instructions and/or data. The circuitry can further include without limitation logic arrays and a system on a chip implementation that integrates some if not all circuitry and components of a computer or other electronic system that processes digital signals, analog signals, and/or mixed digital and analog signals on a single chip substrate.

Generally, the controller includes a modulation module 72 that provides control signals 73 for the switches of the converter 10. The modulation module 72 receives a reference waveform 74, carriers 76 and a command signal that can include the carrier waveforms 60A and 60B that are level shifted between groups 60A and 60B and phase shifted within its own group. Every alternate phase shifted carrier is assigned to the upper arm and lower arm respectively. Because of a multilevel structure the 3 phase MMC has a low switching frequency. A carrier frequency of 1-2 kHz can be used. This results in PWM voltage levels. For each phase of the MMC, two reference signals Vu (upper arm) and V1 (lower arm) are needed to synthesize the output voltage reference. If voltage balancing is desired as described above, a voltage balancing control module 78 can receive the control signals 73 for the switches as inputs and generate modified control signals 75 for the converter 10 (designed in this and other figures discussed below simply as "MMC"). Based on the voltage balancing algorithm discussed above, the voltage balancing control module 78 receives as feedback the direct current 84 flowing in the converter 10 and the voltages across each of the capacitors indicated at 86. The foregoing is also described by A. K. Sahoo and N. Mohan, in "Capacitor Voltage Balancing and an Intelligent Commutation Technique in a New Modular Multilevel Converter Based HVDC System," in Power Electronics, Machines and Drives (PEMD 2014), 7th IET International Conference on, April 2014, pp. 1-6, which is incorporated herein by reference in its entirety.

The remaining figures illustrate different applications and/or configurations of one or more single and/or multiphase converters 10 (herein exemplified by three phase converters, but other multiphase converters could be used).

Figure 8:
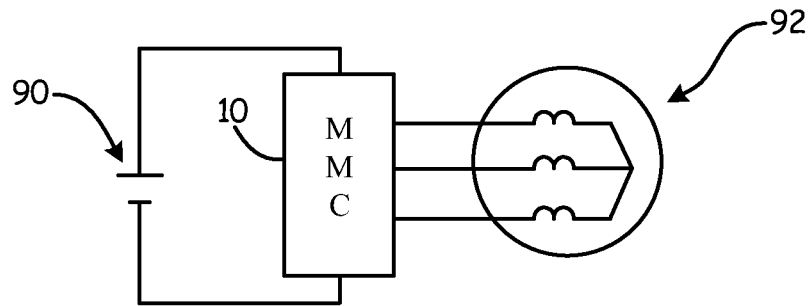

FIG. 8 illustrates a single three phase converter 10 converting power DC between AC, where the DC source is indicated at 90. Three phase component 92 can comprise a three phase load such as but not limited to a motor. However, in another mode of operation the three phase component can comprise a generator. Hence, the three phase converter 10 can function as a motor/generator controller. It should be understood that any reference to or depiction of a motor or a generator does not mean that the embodiment is limited to just a motor or a generator, but rather either a motor or a generator can be implemented.

Figure 9:
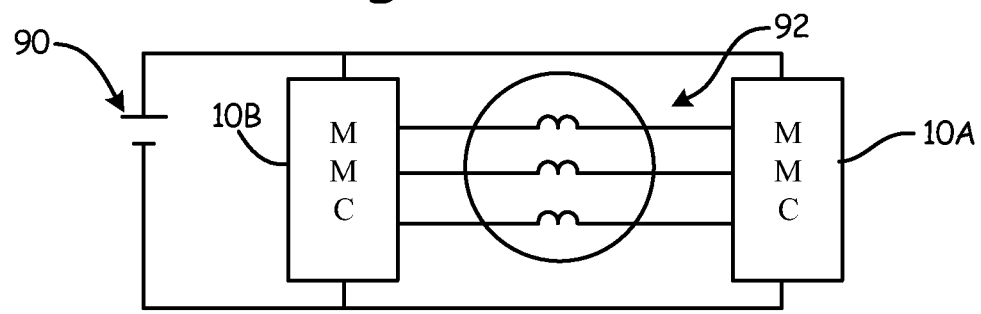

FIG. 9 illustrates two three phase converters 10A and 10B converting power between DC and AC similar to the embodiment of FIG. 8, however, where the three phase component 92 (load, motor and/or generator) has open ended windings.

Figure 10:
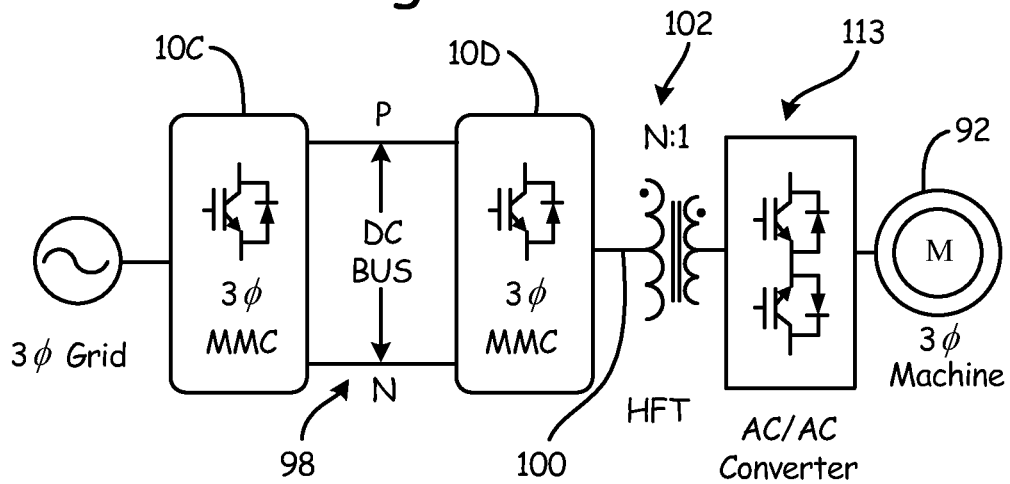

FIG. 10 illustrates two three phase converters 10C and 10D to provide power to or obtain power from three phase component 92 (load, motor and/or generator). In this embodiment, converters 10C and 10D are coupled together by a DC-link 98. This embodiment is useful in generating a high frequency (e.g. in the kHz range, where herein high frequency is at least about 1 kHz, but also to frequencies much higher such as but not limited to at least about 10 KHz, 50 KHz or 100 KHz) waveforms 100 that are provided to an electronic transformer (HFT) 102 that can lower or raise the voltage as needed to provide power to or obtain power from three phase component 92 (load, motor and/or generator).

As indicated above the rotating machine 92 can be a motor or a generator. Due to variation in rotor speed, the magnitude of voltage produced/required by the machine varies. Conventionally, modulation index of the AC/AC converter 113 is controlled to adjust this variable magnitude AC generation by a controller that generates the reference voltage for the matrix converter to meet the variation in load voltage demand. However another solution is to use the controller to control the modulation index of the MMC 10D at the primary of the transformer 102.

With the modulation index of the MMC 10D controlled, the matrix converter 113 is operated at its full modulation index of 0.866. The matrix converter 113 acts as an interface to generate adjustable frequency PWM voltages at the machine terminals. For a reduction in speed to one-half, the voltage requirement by the machine 92 is also reduced to nearly one-half. Hence the MMC 10D is modulated to generate one-half the voltage magnitude at the primary of the HFT 102. This in turn makes use of just one-half the number of submodules. An advantage of controlling MMC 10D on the primary side of the transformer 102 is to reduce the voltage stress related losses in the transformer 102, matrix converter 113 and/or the machine 92. If the voltage passing through the transformer 102 is one-half, the losses are significantly reduced. Control of the MMC on the primary side of the transformer is not limited to the embodiment of FIG. 10, but can be implemented with other of the exemplary embodiments herein disclosed as well as others.

Figure 11:
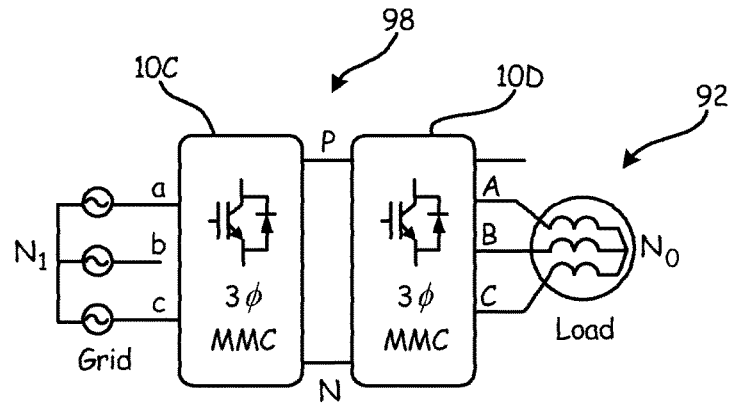

FIG. 11 illustrates a similar embodiment to that of FIG. 10 but does not include the high frequency transformer 102.

Figure 12:
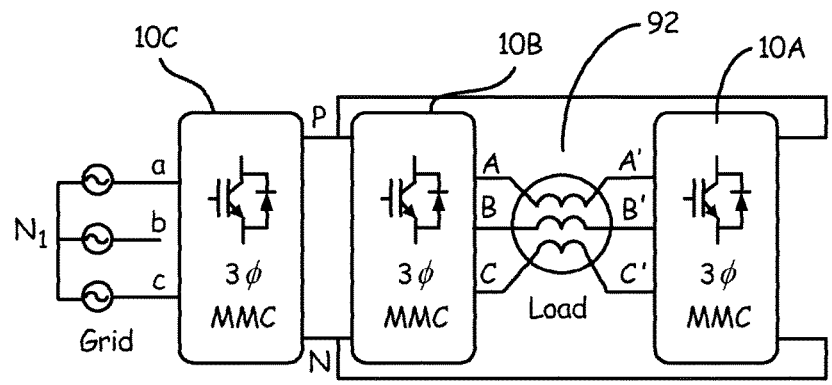

FIG. 12 illustrates and embodiment similar to the embodiment of FIG. 9 with the presence of the DC link 98 formed between converters 10B and 10C rather than a DC source 90.

Figure 13:
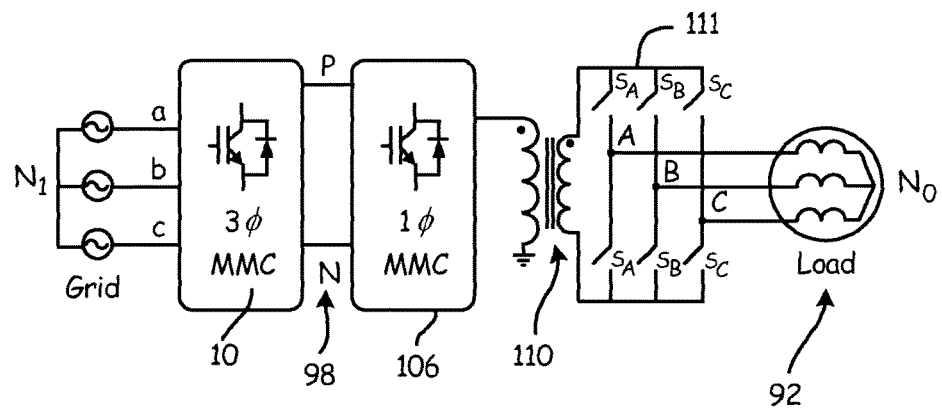

FIG. 13 illustrates use of a three phase converter 10 that forms a DC link 98 with a single phase MMC converter 106 that in turn is coupled to a single phase transformer 110. The single phase secondary winding from transformer 110 is converted to three phase with converter 111 for the three phase component 92.

Figure 14A:
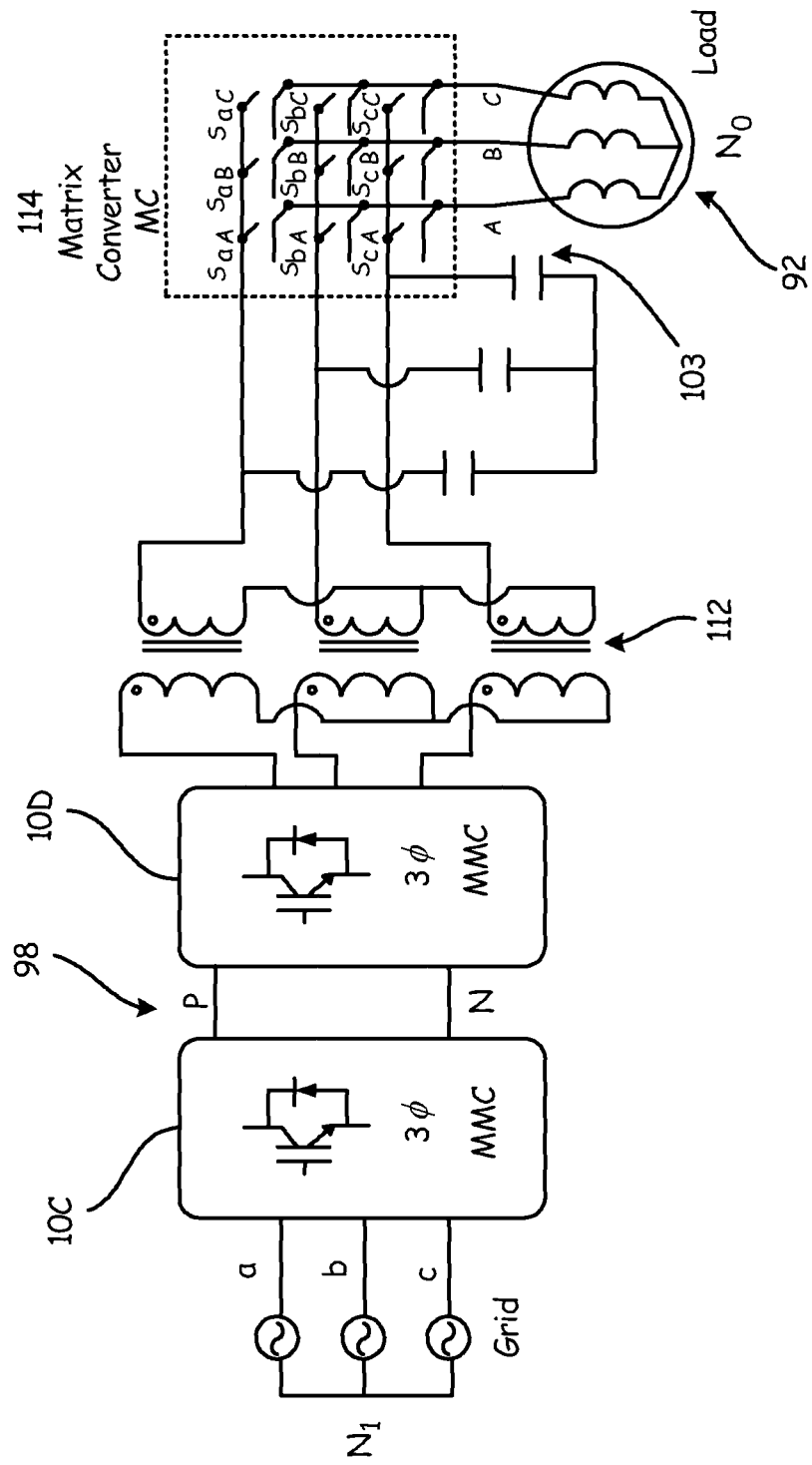

FIG. 14A illustrates converters 10C and 10D coupled by a DC link 98. Converter 10C in turn is coupled to a three phase winding transformer 112 that is coupled to three phase component 92 by a matrix converter indicated at 114.

The 3-phase high frequency transformer 112 is made of two winding transformers with N:1 turns ratio. Converter 10B is used on the high voltage side to synthesize high frequency sinusoidal voltages at the primary of the HFT 112. Use of converter results in near sinusoidal voltage waveforms at reduced switching frequencies.

In this embodiment, the secondary low voltage side of the HFT 112 is connected to a 3×3 matrix converter (MC) 114. It uses an array of controlled bidirectional switches to couple a 3-phase high frequency link with the 3-phase low frequency machine without the need of any intermediate energy storage. Because of pulse width modulation (PWM), the MC 114 injects high frequency switching components into its input current. Hence an LC filter is desired. Here the leakage inductance of the transformer 112 is used along with an externally added very small capacitance 103 for filtering action. This results in sinusoidal currents through the HFT 112. Thus the proposed topology results in sinusoidal voltages and sinusoidal currents through the HFT 112, thus significantly reducing the transformer losses. This advantage applies to circuits such as but not limited to those illustrated in FIGS. 10, 13, 14A and 15-17.

Figure 14B:
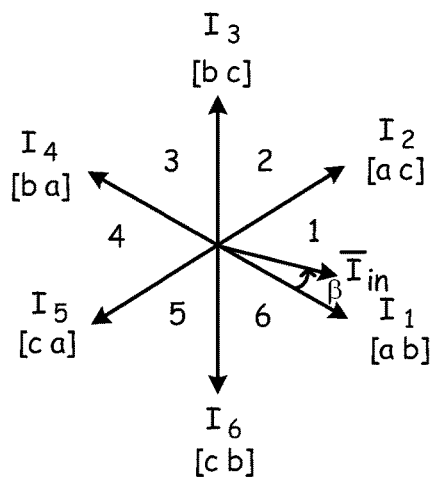
FIGS. 14B and 14C illustrate switching states for a current source inverter (CSI) and a voltage source inverter (VSI), respectively, connected through a virtual DC-link.
Figure 14C:
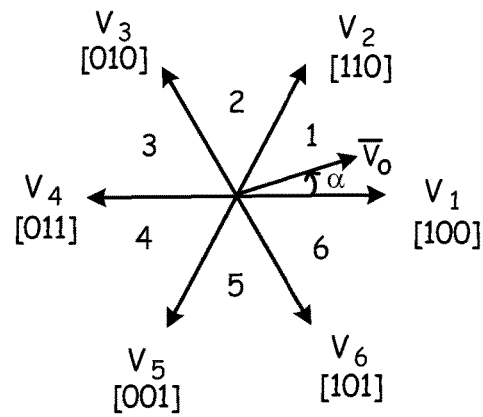
Figure 14D:
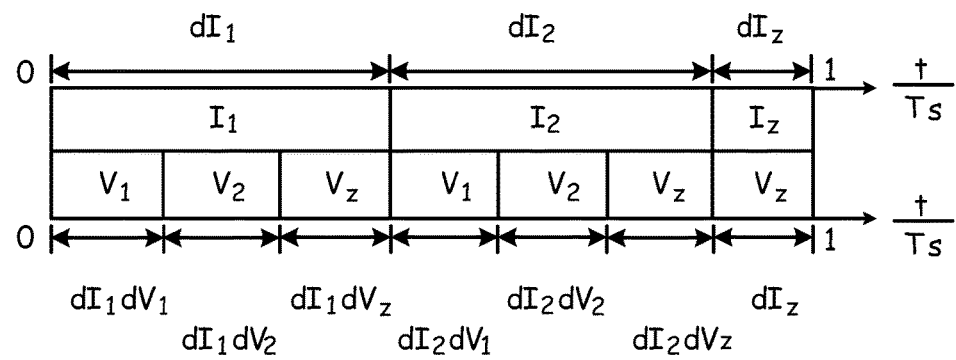
FIG. 14D is switching sequence applied over a sampling cycle for the circuit of FIG. 14A.

By way of example, space vector modulation (SVM) based indirect modulation technique can be used to achieve highest possible voltage transfer ratio (0.866) in the matrix converter 114. In indirect modulation, the MC 114 is modulated using two fictitious converters, a current source inverter (CSI) and a voltage source inverter (VSI) connected through a virtual DC-link. The switching states are shown in FIG. 14B and FIG. 14C respectively. Both of these converters together produce 18 active switching states. For example, state [a b b] in the MC 114 in which a is connected to output phase A and, b is connected to output phase B and C respectively can be implemented by simultaneously applying [a b] and [1 0 0] by the indirect modulation. In one sampling cycle Ts the reference vectors are generated from two adjacent active vectors and one zero vector. dI1, dI2, dIz are the duty ratios of application of these vectors from CSI side. Similarly dV1, dV2, dVz are duty ratios from VSI side. The switching sequence applied over a sampling cycle is given in FIG. 14D.

When the three phase component 92 is a rotating machine such as a generator with varying speed (such as in wind applications) or an adjustable speed motor drive, due to variation in rotor speed, the voltage produced/required by the machine varies. Conventionally, modulation index of the AC/AC converter is controlled to adjust this variable magnitude AC generation. However another solution as presented here is controlling the modulation index of the MMC at the primary of the transformer either when the matrix converter 114 is connected directly to the transformer 112 as in, for example, FIG. 14A or even when a converter 113 is present such as in FIG. 10. The matrix converter is typically operated at its full modulation index of 0.866. For a reduction in speed to one-half, the voltage requirement by the machine is also reduced to nearly one-half (V/f≈constant). Hence, the MMC 10D is modulated to generate half the voltage magnitude at the primary of the HFT 112. The purpose of pushing the control to the MMC 10D is to reduce the voltage stress related losses in the transformer 112, secondary converter 113 (such as but not limited to the AC/AC converter illustrated in FIG. 10), if any, and the machine 92. If the voltage passing through the transformer 112 is one-half, the losses are significantly reduced.

For this aspect of the disclosure comprising using MMC 10D to control a load the machine 92 through a high frequency transformer 112, it should be noted the internal structure of the submodule can be a conventional 2-level half bridge submodule as is well known in the art, or the recently proposed 3-level submodule discussed above. The 3-level submodule has added advantages over the half bridge submodule as it results in nearly half the submodule requirements resulting in a more compact structure and significantly reduced semiconductor losses. In particular, the proposed submodule topology has one switching device (e.g. IGBT/diode) in its conduction path in the FULL ON and BY PASS states. Furthermore, the proposed submodule topology has an extra HALF ON conduction path. Under ideal conditions, this topology would have about a 33.33% reduction conduction losses over for example, submodules comprising a half bridge, in which case, there are two switching devices conducting in the FULL ON and BY PASS state and the extra HALF ON state is not present.

Figure 15:
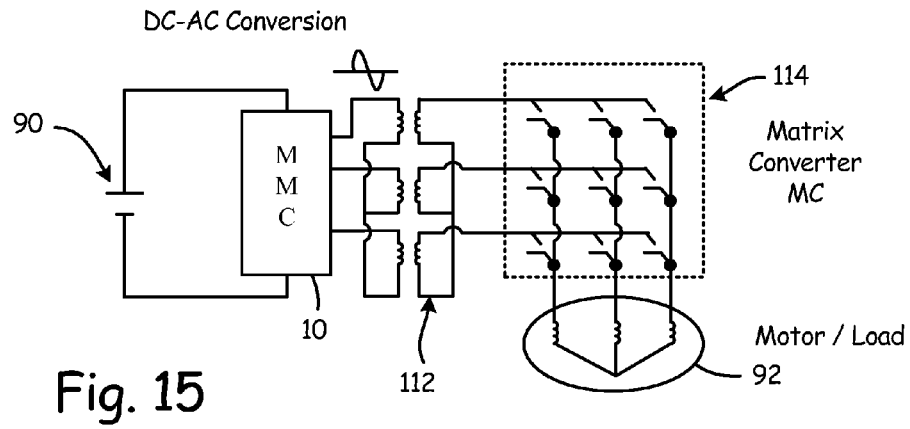
FIGS. 15 and 16 are schematic diagrams of applications of modular, multilevel, multi-phase converter(s).

FIG. 15 illustrates an embodiment similar to the embodiment of FIG. 14 where a DC source 90 is provided instead of DC link 98.

Figure 16:
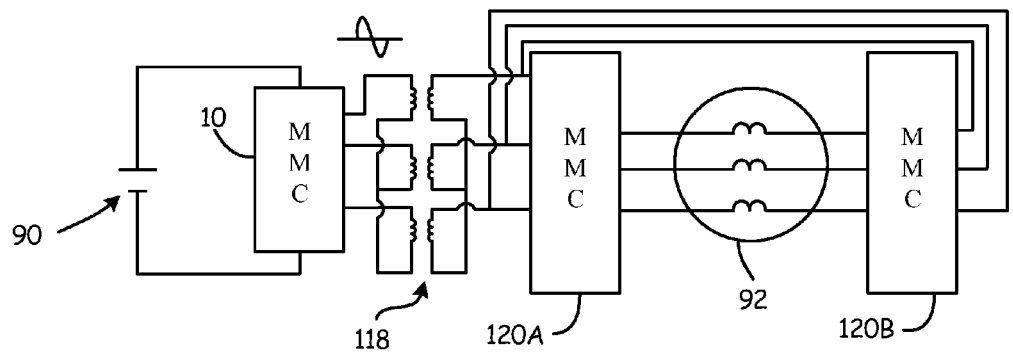

FIG. 16 illustrates a three phase converter 10 coupled to a three phase high frequency transformer 118 that in turn is coupled to matrix converters 120A and 120B in a manner similar to the embodiment of FIG. 12.

Figure 17:
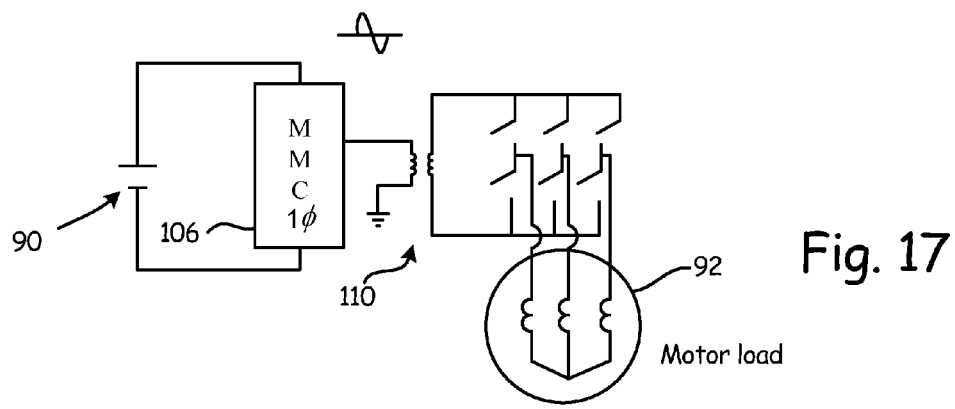
FIG. 17 is a schematic diagram of an application of a modular, multilevel single phase converter.

FIG. 17 illustrates an embodiment similar to the embodiment of FIG. 13 having the DC source 90 rather than DC link 98.

Figures 18A, 18B:
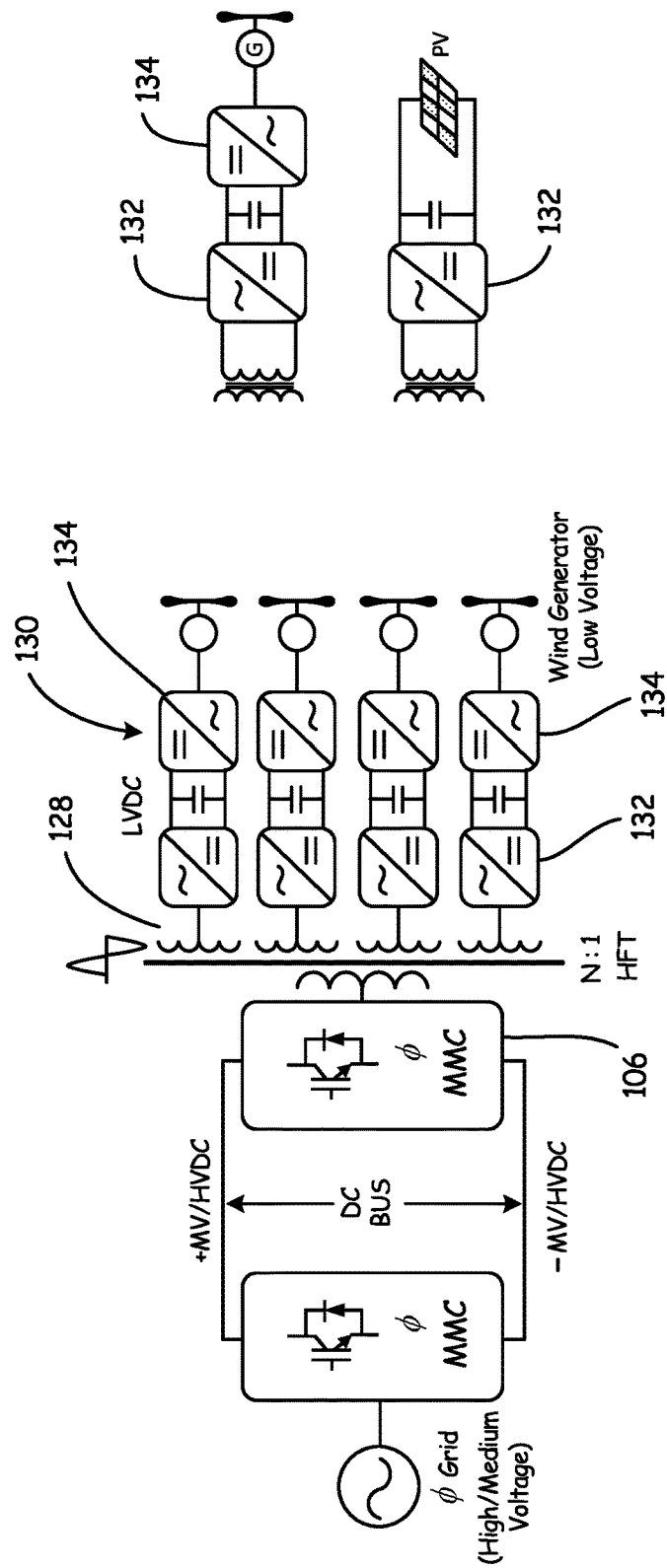
FIG. 18A is a schematic diagram of another application of a modular, multilevel single phase converter.
FIG. 18B is a schematic diagram illustrating exemplary secondary side applications for the converter of FIG. 18A.

FIG. 18A illustrates a multi-winding power electronic transformer topology using MMC for renewable energy integration. This topology can integrate multiple wind generators and/or solar photovoltaics (FIG. 18B) to a medium/high voltage AC or DC grid. Similar to FIG. 13, a three phase converter 10 forms a DC link 98 with a single phase MMC converter 106 that in turn in this embodiment is coupled to a single phase high frequency transformer 128 having multiple secondary windings 150. In addition to the other advantages described above provided by a MMC converter 106 on the high voltage, primary side of a high frequency transformer, the embodiment of FIG. 18A uses a single transformer 128 with multiple secondary windings to interface numerous renewables. This results in a much reduced transformer volume and weight. Also the high frequency transformer 128 provides galvanic isolation. Because of multi-winding structure, multiple renewable energy sources can be interfaced like wind, photovoltaic (PV), etc. Also the MMC converter has a medium/high voltage DC terminal or bus 98, which can be used for DC transmission/distribution. For instance, The DC bus 98 could be very short as in the case of onshore wind farms or could be 100 miles HVDC line for offshore wind farms. Thus the embodiment of FIG. 18A presents a very flexible solution for renewable energy integration to an AC/DC grid. By way of example and not limitation a H-bridge converter 132 and a pulse width modulated (PWM) inverter 134 can be used for each wind generator 134, while a H-bridge converter 132 can interface photovoltaics, as illustrated in FIG. 18B. Further details regarding this embodiment can be found in "High Frequency Link Multi-winding Power Electronic Transformer using Modular Multilevel Converter for Renewable Energy Integration" by Ashish Kumar Sahoo and Ned Mohan published at IECON'2014, Dallas, Tex. October 29-Nov. 1, 2014, which is incorporated herein by reference in its entirety.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A submodule for a modular multilevel converter, the submodule comprsing:
two electronic switches connected together with a first series connection terminal connecting the electronic switches in series;
two capacitors connected together with a second series connection terminal connecting the capacitors in series, the series connected switches being connected in parallel with the series connected capacitors; and
a bidirectional electronic switch connects the first series connection terminal with the second series connected terminal, wherein an output voltage is obtained across the first series connected terminal and a common terminal formed by the parallel connection of the series connected switches with the series connected capacitors, and wherein the bidirectional electronic switch comprises a full bridge rectifier having conventionally connected diodes with comnonly connected anodes and commonly connected cathodes and an electronic switch connected between the commonly connected anodes and the commonly connected cathodes.

2. A multi-level converter comprising:
a plurality of submodules configured to connect to a source of power, each submodule comprising:
two electronic switches connected together with a first series connection terminal connecting the electronic switches in series;
two capacitors connected together with a second series connection terminal connecting the capacitors in series, the series connected electronic switches being connected in parallel with the series connected capacitors; and
a bidirectional electronic switch connecting the first series connection terminal with the second series connected terminal, wherein an output voltage is obtained across the first series connected terminal and a common terminal formed by the parallel connection of the series connected switches with the series connected capacitors;
wherein an upper arm comprises a first submodule connected in series with a second submodule by the first series connection terminal of the first submodule being connected to the common terminal of the second submodule;
wherein a lower arm comprises a third submodule connected in series with a fourth submodule by the first series connection terminal of the third submodule being connected to the common terminal of the fourth submodule; and wherein the common terminal of the first submodule is connected to the common terminal of the third submodule so as to provide a terminal between the one upper arm of series connected submodules and the lower arm of series connected submodules; and a controller operably connected to each of the electronic switches, the controller controlling each of the electronic switches in order that the terminal carries alternating current power, wherein the controller configures each submodule in one of at least three operating states, the operating states including a FULL ON state wherein both of the capacitors of a submodule are operably connected in series with at least one other submodule, a HALF ON state wherein one of the capacitors of a submodule are operably connected in series with at least one other submodule, and wherein a BYPASS state wherein none of the capacitors are connected in series with at least one other submodule.

3. The converter of claims 2 wherein the plurality of submodules are configured to connect to a multi-phase source of power wherein the plurality of submodules are configured in phases, each phase comprising an upper arm of series connected submodules and a lower arm of series connected submodules with a phase terminal provided between each upper arm of series connected submodules and each lower arm of series connected submodules, the controller controlling each of the electronic switches in order that the phase terminals carry altenating current power.

4. The converter of claim 3 and further comprising a transformer having a first set of windings and a second set of windings, the phase terminals of the converter being connected to the first set of windings and a multiphase component being connected to the second set windings.

5. The converter of claim 4 wherein the controller is configured to vary the voltage across the first set of windings to control an operating state of the multiphase component.

6. The converter of claim 2 wherein the controller is configured to control the electronic switches based on a hybrid control scheme wherein the controller is configured to use two sets or groups of carrier waveforms wherein the carriers are phase shifted for the submodules and level shifted for the electronic swithes inside each submodule.

7. The converter of claim 2 wherein the capacitors of at least one submodule do not have the same capacitance, and wherein the controller controls the electronic switches in order to configure each submodule in one of at least four operating states, the operating states including a second HALF ON state wherein one of the two capacitors of the submodule is operably connected in series with at least another submodule, the first-mentioned HALF ON state being with the other of the two capacitors of the submodule operably connected in series with at least one other submodule.

8. The converter of claim 2 wherein the controller is configured to control each submodule based on at least a current direction and voltages across each of the capacitors.

9. The converter of claim 2 wherein each bidirectional switch comprises a 4-quadrant bidirectional switch in common emitter configuration.

10. The converter of claim 2 wherein each bidirectional switch comprises a full bridge rectifier having conventionally connected diodes with commonly connected anodes and commonly connected cathodes and an electronic switch connected between the commonly connected anodes and the commonly connected cathodes.

11. A multilevel converter assembly to operate a component, comprising:
a high frequency transformer having a first winding and a second winding, the second winding being configured to connect to the component;
a plurality of submodules configured to connect to an AC source of power wherein the plurality of submodules comprise an upper arm of series connected submodules and a lower arm of series connected submodules with a terminal provided between the upper arm of series connected submodules and the lower arm of series connected submodules, each submodule comprising:
at least one capacitor; and
at least two electronic switches to selectively connect the capacitor in series with at least one other submodule; and
wherein power flows through the submodules between the AC source of power and the first winding; and
a controller operably connected to each of the electronic switches, the controller controlling each of the electronic switches in order to configure each submodule in one of at least two operating states, the operating states including a FULL ON state wherein the capacitor of a submodule is operably connected in series with at least one other submodule, and a BYPASS state wherein the capacitor is not connected in series with at least one capacitor of another submodule, and wherein the controller is configured to provide at least near sinusoidal high frequency voltage across the first winding, the controller controlling operation of the electronic switches to adjust amplitude of AC voltage of near sinusoidal high frequency voltage across the first winding so as to adjust an amplitude of AC voltage of near sinusoidal high frequency voltage across the second winding, and wherein the controller is configured to generate at least near sinusoidal voltage to be applied to the first winding, the at least near sinusoidal voltage having a frequency of at least 1 kilohertz.

12. The converter assembly of claim 11 wherein each module comprises at least two capacitors, and wherein the controller controls each of the electronic switches in order to configure each submodule in one of at least three operating states, the operating states including a HALF ON state wherein one of the capacitors of a submodule is operably connected in series with at least one capacitor of another submodule.

13. The converter assembly of claim 12 wherein the capacitors of at least one submodule do not have the same capacitance, and wherein the controller controls the electronic switches in order to configure each submodule in one of at least four operating states, the operating states including a second HALF ON state wherein one of the two capacitors of the submodule is operably connected in series with at least one capacitor of another submodule, the first-mentioned HALF ON state being with the other of the two capacitors of the submodule is operably connected in series with at least one capacitor of another submodule.

14. The converter assembly of claim 11 wherein a second converter is operably connected between the second winding and the component.

15. The converter assembly of claim 11 wherein the transformer comprises a multi-phase transformer and the plurality of submodules are configured in phases, each phase comprising an upper arm of series connected submodules and a lower arm of series connected submodules with a phase terminal provided between the upper arm of series connected submodules of each corresponding phase and the lower arm of series connected submodules of each corresponding phase, the phase terminals being connected to different windings of the multi-phase transformer, the controller controlling each of the electronic switches in order that the phase terminals carry altenating current power.

16. The converter assembly of claim 11 wherein the controller is configured to generate at least near sinusoidal voltage at a frequency of at least 10 kilohertz.

17. The converter assembly of claim 11 wherein the controller is configured to vary the voltage across the first winding to control an operating state of the component.

18. The converter assembly of claim 11 wherein the controller is configured to control the electronic switches based on a hybrid control scheme wherein the controller is configured to use two sets or groups of carrier waveforms wherein the carriers are phase shifted for the submodules and level shifted for the electronic swithes inside each submodule.

19. The converter assembly of claim 11 wherein the component comprises a high frequency AC to DC converter.

20. The converter assembly of claim 11 wherein the component comprises a high frequency AC to AC converter.

21. The converter assembly of claim 11 wherein the component comprises at least one of a capacitor and a photovoltiac source.

22. The converter assembly of claim 11 wherein the first winding is configured to operate at least 25K volts.

23. The converter assembly of claim 11 and further comprising a second plurality of submodules configured to connect to a multi-phase source of power, the plurality of submodules and the second plurality of submodules configured in phases, each phase comprising an upper arm of series connected submodules and a lower arm of series connected submodules with a phase terminal provided between the upper arm of series connected submodules of each corresponding phase and the lower arm of series connected submodules of each corresponding phase, each phase terminal of the second plurality of submodules being connected to a different phase of the multi-phase source of power, the second plurality of submodules connected to the plurality of submodules with a DC link, the controller controlling each of the electronic switches of the second plurality of submodules in order that the phase terminals carry altenating current power, each submodule of the second plurality of submodules of each arm comprising:

at least two second electronic switches to selectively connect the second capacitor in series with another submodule of the corresponding arm; and a second capacitor; and wherein the controller is operably connected to each of the second electronic switches, the controller controlling each of the second electronic switches in order to configure each submodule in one of at least two operating states, the operating states including a FULL ON state wherein the second capacitor of a submodule of the second plurality of submodules of each corresponding arm is operably connected in series with at least one other submodule of each corresponding arm, and a BYPASS state wherein the second capacitor is not connected in series with at least one second capacitor of another submodule of each corresponding arm.

* * * * *